US012781471B2

(12) United States Patent
Sasaki et al.

(10) Patent No.: US 12,781,471 B2
(45) Date of Patent: Nov. 3, 2026

(54) REMOTE OPERATION SUPPORT SYSTEM AND REMOTE OPERATION SUPPORT METHOD

(71) Applicant: KOBELCO CONSTRUCTION MACHINERY CO., LTD., Hiroshima (JP)

(72) Inventors: Hitoshi Sasaki, Tokyo (JP); Yusuke Fujiwara, Hiroshima (JP); Kazuhiro Ueda, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 185 days.

(21) Appl. No.: 18/721,261

(22) PCT Filed: Dec. 21, 2022

(86) PCT No.: PCT/JP2022/047135

§ 371 (c)(1),
(2) Date: Jun. 18, 2024

(87) PCT Pub. No.: WO2023/136070

PCT Pub. Date: Jul. 20, 2023

(65) Prior Publication Data

US 2025/0270790 A1 Aug. 28, 2025

(30) Foreign Application Priority Data

Jan. 14, 2022 (JP) ................................ 2022-004656

(51) Int. Cl.
*E02F 9/20* (2006.01)
*G06T 3/40* (2024.01)

(52) U.S. Cl.
CPC ................ *E02F 9/205* (2013.01); *G06T 3/40* (2013.01)

(58) Field of Classification Search
CPC ..... E02F 9/205; E02F 9/20; E02F 9/26; E02F 9/261; E02F 9/264; G06T 3/40;
(Continued)

(56) References Cited

U.S. PATENT DOCUMENTS

| | | | |
|---|---|---|---|
| 8,493,233 | B2 | 7/2013 | Hirota et al. |
| 8,624,977 | B2 | 1/2014 | Satoh |

(Continued)

FOREIGN PATENT DOCUMENTS

| | | | |
|---|---|---|---|
| JP | 2005-188160 | A | 7/2005 |
| JP | 2006-011516 | A | 1/2006 |

(Continued)

OTHER PUBLICATIONS

PCT/ISA/210 from International Application PCT/JP2022/047135 with the English translation thereof.

(Continued)

*Primary Examiner* — Jeffery A Brier
(74) *Attorney, Agent, or Firm* — Carrier, Shende & Associates P.C.; Joseph P. Carrier; Jeffrey T. Gedeon

(57) ABSTRACT

A remote operation support system and method that can improve spatial recognition accuracy by an operator who remotely operates work machine is provided. A captured image representing a sight around work machine (40) is captured by an imaging device (412*b*) mounted on the work machine (40). A synthetic image is generated by superimposing an index image representing an index member positioned in a cab (454) (operator's room) of the work machine (40) in a pseudo manner on the captured image. The synthetic image is displayed on a remote output interface (220) of a remote operation device (20) that allows remote operation of the work machine (40).

7 Claims, 10 Drawing Sheets

(58) Field of Classification Search
CPC .............. G06T 19/006; G05D 2105/05; G05D 2107/90; G05D 2109/10; G05D 1/2249; G08C 17/02; H04N 7/18
See application file for complete search history.

(56) References Cited

U.S. PATENT DOCUMENTS

| | | | | |
|---|---|---|---|---|
| 9,646,572 | B2 | 5/2017 | Yamada et al. | |
| 9,946,435 | B2 | 4/2018 | Watanabe et al. | |
| 2020/0399861 | A1 * | 12/2020 | Ito | E02F 9/123 |
| 2022/0220706 | A1 | 7/2022 | Otani et al. | |

FOREIGN PATENT DOCUMENTS

| | | | | |
|---|---|---|---|---|
| JP | 2009-225322 | A | | 10/2009 |
| JP | 2014-197818 | A | | 10/2014 |
| JP | 2015-127870 | A | | 7/2015 |
| JP | 2020-161934 | A | | 10/2020 |
| JP | 2021046719 | A | * | 3/2021 |
| WO | 2009/104675 | A1 | | 8/2009 |
| WO | 2021/220407 | A1 | | 11/2021 |

OTHER PUBLICATIONS

PCT/ISA/237 from International Application PCT/JP2022/047135.
Office Action dated Apr. 8, 2025 issued in the corresponding Japanese Patent Application No. 2022-004656 with the English machine translation thereof.

* cited by examiner

REMOTE OPERATION SUPPORT SYSTEM AND REMOTE OPERATION SUPPORT METHOD

TECHNICAL FIELD

The present invention relates to a remote operation support system having a function of intercommunication with each of work machine and a remote operation device that allows remote operation of the work machine.

BACKGROUND ART

When an operator performs operation such as rotation of an upper rotating body of work machine, the operator confirms whether an obstacle exists around the work machine. For example, concerning rearward of the work machine, a camera capable of capturing an image of the rearward of the work machine is provided, and the operator confirms the image captured by the camera for confirmation of an obstacle. For example, a rearward view display device of a rotary work vehicle has been proposed, which includes a camera for obtaining a rearward view of an upper rotating body and a monitor that displays an image obtained by this camera, and which displays an arc-like distance display line centering around a rotational center of the upper rotating body in a superimposed manner on the image captured by the camera (see, for example, Patent Literature 1).

CITATION LIST

Patent Literature

Patent Literature 1

Japanese Patent Laid-Open No. 2005-188160

SUMMARY OF INVENTION

Technical Problem

By the way, in a case where an operator performs operation such as rotation of an upper rotating body with respect to a lower traveling body while the operator is actually on work machine, the operator is aware of a specific object existing in his/her field of view, such as a pillar in an operator's room which rotates along with the upper rotating body as a reference for recognizing a position and/or azimuth of the upper rotating body in a real space. When the operator operates the work machine using a remote operation device, the operator recognizes the space through a captured image captured by a camera or an imaging device mounted on the work machine. However, there is a case where spatial recognition is difficult because a specific object is not in the captured image.

It is therefore an object of the present invention to provide a remote operation support system, and the like, capable of improving spatial recognition accuracy by an operator who remotely operates work machine.

Solution to Problem

A remote operation support system of the present invention causes a synthetic image to be displayed on a remote output interface of a remote operation device that allows remote operation of work machine, the synthetic image being an image in which an index image corresponding to an index member positioned in an operator's room of the work machine is superimposed on a captured image captured by an imaging device which is mounted on the work machine and which is capable of capturing an image around the work machine.

According to the remote operation support system thus configured, the synthetic image in which the index image is superimposed on the captured image is displayed on the remote output interface. The operator can therefore recognize a position and a posture in a real space of an object that is in the captured image as if the operator were actually in the operator's room using a pseudo index member positioned in the operator's room included in the synthetic image as a reference. This results in improving spatial recognition accuracy through the synthetic image by the operator who remotely operates the work machine even in a case where the index member is not in the captured image.

In the remote operation support system thus configured,
- the index image is preferably an image having such transparency that at least part of a superimposed region in the captured image is visible or a line map representing at least one of outline or a ridge line of the index member.

According to the remote operation support system thus configured, decrease in visibility of the captured image due to the index image superimposed on the captured image is prevented or avoided, and thus, spatial recognition accuracy through the synthetic image by the operator who remotely operates the work machine is improved correspondingly.

In the remote operation support system thus configured,
- the index image is preferably displayed with a size according to a magnification of the captured image.

According to the remote operation support system thus configured, the index image is displayed on the remote output interface after its size being appropriately adjusted or re-sized in accordance with the magnification of the captured image. It is therefore possible to make a sense of distance obtained by the operator from the synthetic image appropriate.

In the remote operation support system thus configured,
- in a case where rotation operation of an upper rotating body on which the imaging device of real machine is mounted in the work machine with respect to a lower traveling body is performed, the synthetic image is preferably displayed on the remote output interface.

According to the remote operation support system thus configured, the synthetic image is displayed in a case where the rotation operation for the work machine is started, so that it is possible to display the synthetic image in a case where the operator needs display of the index image.

In the remote operation support system thus configured,
- in a case where rotation operation of the upper rotating body on which the imaging device of real machine is mounted in the work machine with respect to the lower traveling body comes to an end, display of the synthetic image on the remote output interface is preferably ended.

According to the remote operation support system thus configured, display of the synthetic image is ended in a case where the rotation operation for the work machine comes to an end, so that it is possible to resolve botheration caused by display of the index image indefinitely continuing.

A remote operation support composite system of the present invention includes
- the remote operation support system, and
- at least one of the work machine or the remote operation device.

According to the remote operation support system thus configured, a composite system that coordinates with at least one of the work machine or the remote operation device can be constituted, so that usability can be improved.

A remote operation support method of the present invention includes

- a step of causing a synthetic image to be displayed on a remote output interface of a remote operation device that allows remote operation of the work machine, the synthetic image being an image in which an index image corresponding to an index member positioned in an operator's room of the work machine is superimposed on a captured image captured by an imaging device which is mounted on the work machine and which is capable of capturing an image around the work machine.

According to the remote operation support method thus configured, the remote operation support method includes the step of causing the synthetic image to be displayed on the remote output interface of the remote operation device that allows remote operation of the work machine, so that spatial recognition accuracy by the operator who remotely operates the work machine can be improved.

DESCRIPTION OF EMBODIMENTS

First Example

Configuration of Remote Operation Support System

Figure 1:
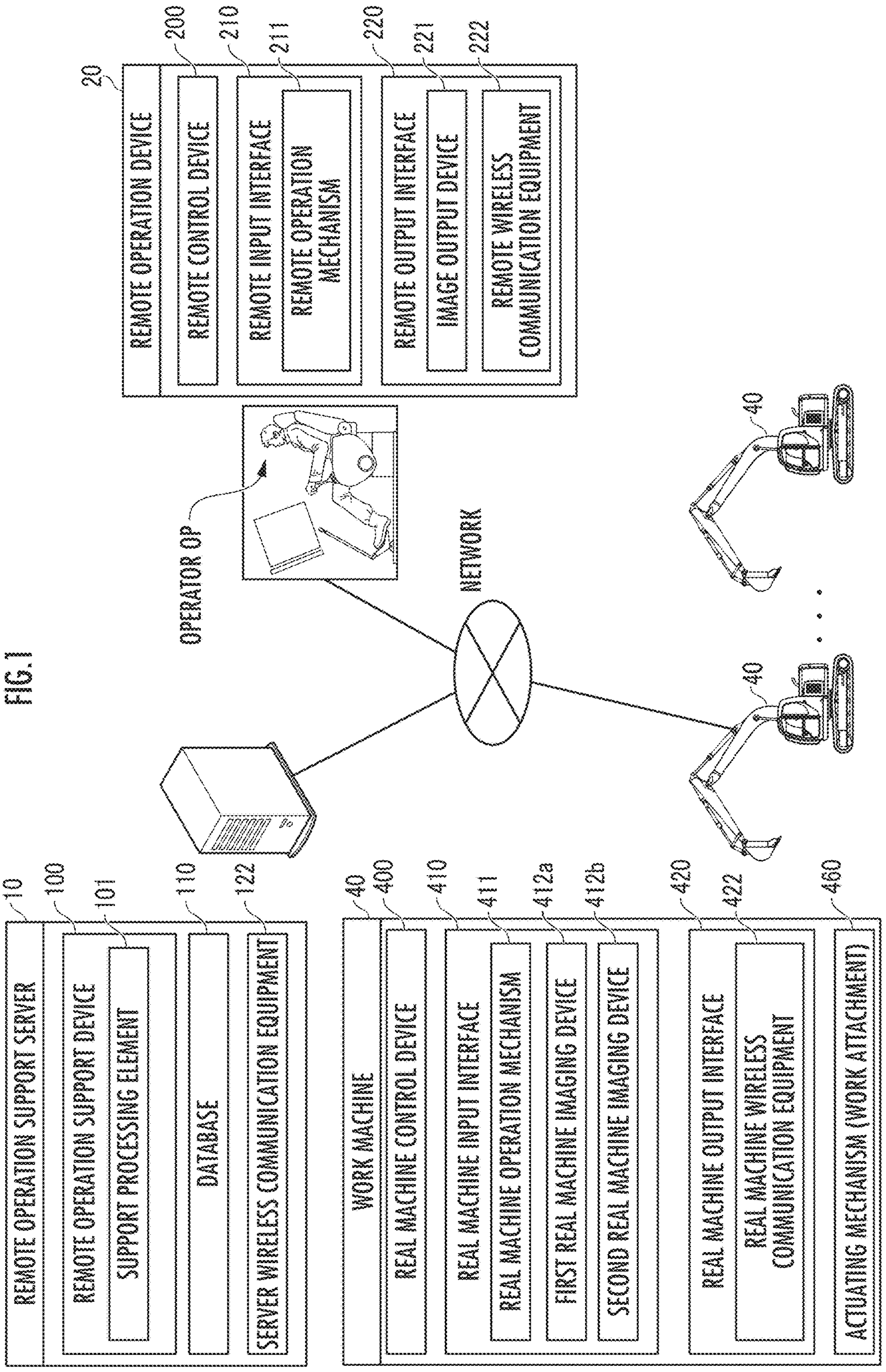
FIG. 1 is a configuration diagram of a remote operation support system as one embodiment of the present invention.

A remote operation support system as one embodiment of the present invention illustrated in FIG. 1 includes a remote operation support server 10 for supporting remote operation of one or a plurality of pieces of work machine 40 by a remote operation device 20. The remote operation support server 10 can communicate interchangeably with the remote operation device 20 and each of the plurality of pieces of work machine 40 via a network. A communication network between the remote operation support server 10 and the remote operation device 20 and/or the work machine 40 and a communication network between the remote operation support server 10 and the work machine 40 may be networks employing the same communication format or may be networks employing different communication formats.

"Acquiring" various kinds of information by components (hardware) of the present invention is concept including every arithmetic processing for preparing various kinds of information in a form that can be utilized in subsequent arithmetic processing, such as receiving the information, reading or searching for the information from an internal storage device (for example, a memory) and/or an external storage device (for example, an external database server), calculating, estimating, predicting, identifying, and the like, information by executing arithmetic processing on information that is received, read, searched, and the like.

Configuration of Remote Operation Support Server

The remote operation support server 10 includes a remote operation support device 100 including a support processing element 101, a database 110, and server wireless communication equipment 122 for communication via a network.

The support processing element 101, which includes an arithmetic processing device (a CPU, a single core processor, a multi core processor or a processor core constituting this), reads necessary data and software from a storage device such as a memory and executes arithmetic processing which will be described later according to the software on the data.

The database 110 stores and holds captured image data, and the like, acquired by an imaging device such as a first real machine imaging device 412*a* and a second real machine imaging device 412*b*, position data, and the like, for superimposing an index image on a second captured image which will be described later. The database 110 may be constituted with a database server different from the remote operation support server 10.

Configuration of Remote Operation Device

The remote operation device 20 includes a remote control device 200, a remote input interface 210 and a remote output interface 220. The remote control device 200, which includes an arithmetic processing device (a single core processor, a multi core processor or a processor core constituting this), reads necessary data and software from a storage device such as a memory and executes arithmetic processing according to the software on the data.

The remote input interface 210 includes a remote operation mechanism 211.

The remote operation mechanism 211 includes a traveling operation device, a rotation operation device, a boom operation device, an arm operation device, a bucket operation device, and a hydraulic lock lever (cutoff lever) that switches an acceptance state of operation by an operator. Each operation device includes an operation lever that receives rotation operation. The operation lever (traveling lever) of the traveling operation device is operated to move a lower traveling body 430 including a pair of right and left crawlers of the work machine 40. The traveling lever may also act as a traveling pedal. For example, a traveling pedal fixed at a base portion or a lower end portion of the traveling lever may be provided.

The operation lever (rotation lever) of the rotation operation device is operated to move a hydraulic swing motor constituting a rotation mechanism 440 of the work machine 40. The operation lever (boom lever) of the boom operation device is operated to move a boom cylinder 462 of the work machine 40. The operation lever (arm lever) of the arm operation device is operated to move an arm cylinder 464 of the work machine 40. The operation lever (bucket lever) of the bucket operation device is operated to move a bucket cylinder 466 of the work machine 40. The cutoff lever outputs a signal for prohibiting/allowing operation of the work machine 40 in accordance with switching of ON/OFF. For example, when the cutoff lever is in an ON state, a signal for operating the work machine 40 is not output even if the operator performs operation.

Figure 2:
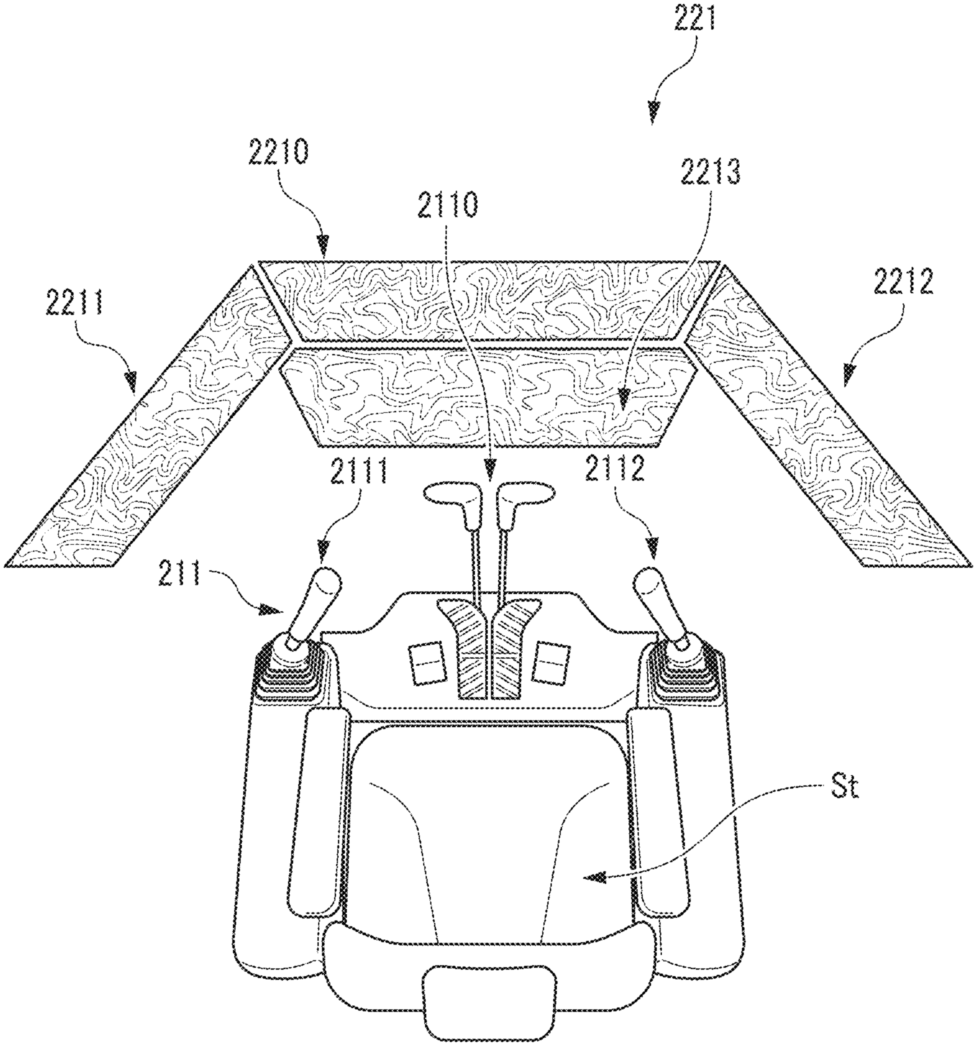
FIG. 2 is an explanatory diagram regarding a configuration of a remote operation device in FIG. 1.

For example, as illustrated in FIG. 2, the respective operation levers that constitute the remote operation mechanism 211 are positioned around a seat St on which an operator OP sits. While the seat St has a form like a high-back chair with an armrest, a seating portion may have an arbitrary form on which the operator OP can sit, such as a form like a low-back chair without a headrest or a form like a chair without a backrest.

A pair of right and left traveling levers 2110 corresponding to the right and left crawlers are positioned side by side in front of the seat St. One operation lever may act as a plurality of operation levers. For example, a left operation lever 2111 provided in front of a left frame of the seat St illustrated in FIG. 2 may function as an arm lever in a case of being operated in a front-back direction and may function as a rotation lever in a case of being operated in a horizontal direction. In a similar manner, a right operation lever 2112 provided in front of a right frame of the seat St illustrated in FIG. 2 may function as a boom lever in a case of being operated in a front-back direction and may function as a bucket lever in a case of being operated in a horizontal direction. A lever pattern may be arbitrarily changed by an operation instruction from the operator OP.

The remote output interface 220 includes an image output device 221, and remote wireless communication equipment 222 for communication via a network.

For example, as illustrated in FIG. 2, the image output device 221 includes a central image output device 2210, a left image output device 2211, and a right image output device 2212 each having a substantially rectangular screen and respectively positioned in front of, diagonally forward left, and diagonally forward right of the seat St, and a lower image output device 2213 having a substantially rectangular screen and positioned below the central image output device 2210. Shapes and sizes of the screens (image display regions) of the central image output device 2210, the left image output device 2211, the right image output device 2212 and the lower image output device 2213 may be the same or different from each other.

The screens of the central image output device 2210, the left image output device 2211, the right image output device 2212 and the lower image output device 2213 may be parallel to a vertical direction or may be inclined with respect to the vertical direction. At least one image output device among the central image output device 2210, the left image output device 2211, the right image output device 2212 and the lower image output device 2213 may be constituted with a plurality of divided image output devices. For example, the central image output device 2210 may be constituted with a pair of image output devices which have substantially rectangular screens and which are vertically adjacent to each other.

Configuration of Work Machine

As illustrated in FIG. 1, the work machine 40 includes a real machine control device 400, a real machine input interface 410, a real machine output interface 420 and an actuating mechanism 460.

The real machine control device 400, which includes an arithmetic processing device (a single core processor, a multi core processor or a processor core constituting this), reads necessary data and software from a storage device such as a memory and executes arithmetic processing according to the software on the data.

Figure 3:
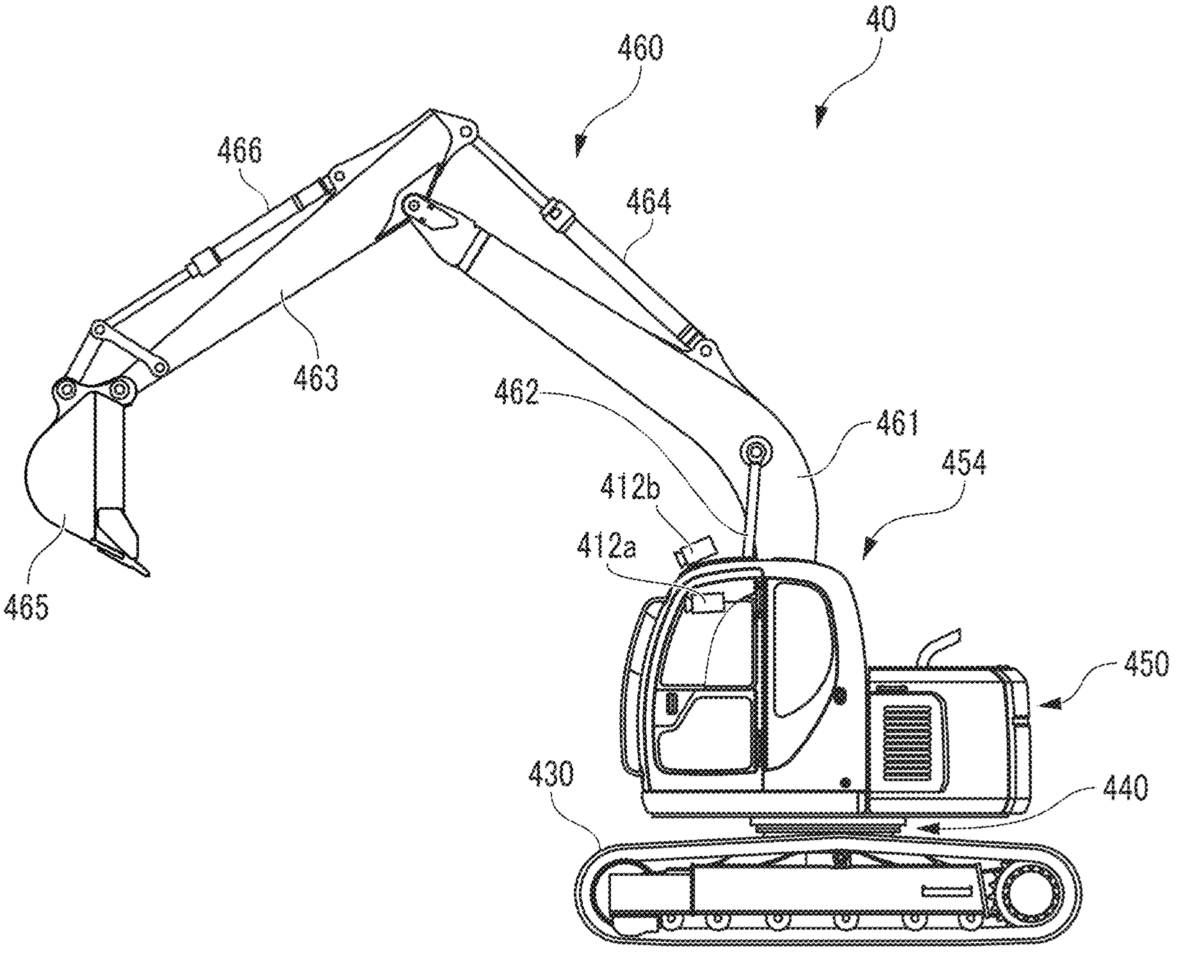
FIG. 3 is an explanatory diagram regarding a configuration of work machine in FIG. 1.

The work machine 40, which is, for example, a crawler shovel (work machine) of a hydraulic type, an electric type, or a hybrid drive type which is a combination of the hydraulic type and the electric type, includes the lower traveling body 430, and the upper rotating body 450 mounted on the lower traveling body 430 so as to be able to rotate via the rotation mechanism 440 as illustrated in FIG. 3 that is a side view of the work machine 40. A cab 454 (operator's room) is provided in a left portion in front of the upper rotating body 450. The actuating mechanism 460 is provided in a central portion in front of the upper rotating body 450.

The real machine input interface 41 includes a real machine operation mechanism 411, the first real machine imaging device 412*a*, the second real machine imaging device 412*b*, and a rearward imaging device (not shown). The real machine operation mechanism 411 includes a plurality of real machine operation levers positioned around a seat positioned inside the cab 454 in a similar manner to the remote operation mechanism 211.

In the work machine 40, a drive mechanism or a robot that receives a signal according to how remote operation levers are operated and operates the real machine operation levers on the basis of the received signal is provided in the cab 454.

The first real machine imaging device 412*a* (main camera) is, for example, provided inside the cab 454. The first real machine imaging device 412*a* captures an image of an environment including at least part of the actuating mechanism 460 through a front window and a pair of right and left side windows. The first real machine imaging device 412*a*, for example, captures an image of a sight around the work machine 40 including at least part of the bucket 465 which is an attachment.

Figure 4:
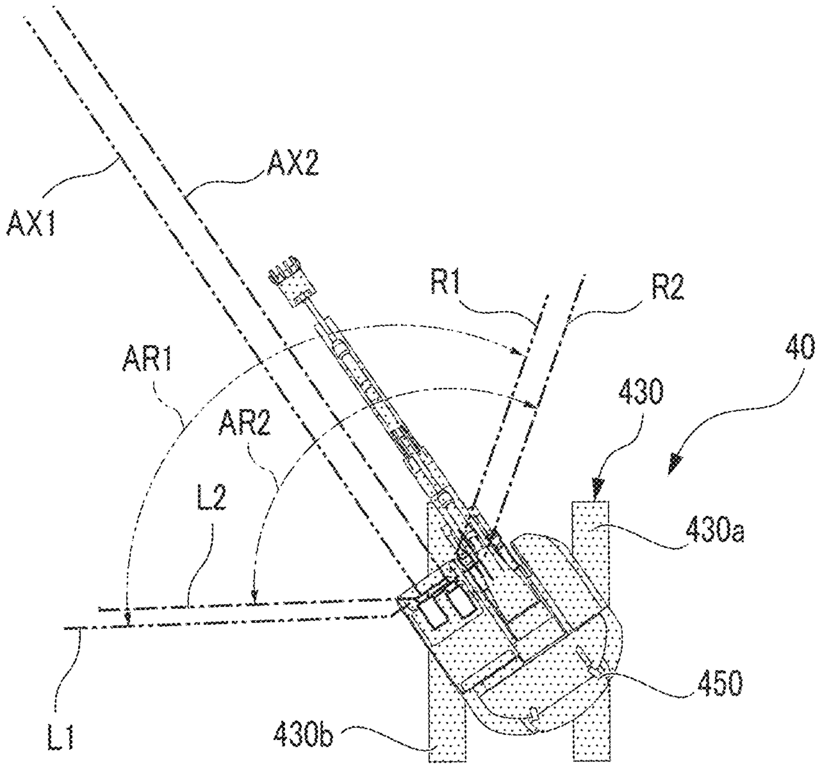
FIG. 4 is an explanatory diagram regarding an environment around the work machine in FIG. 1.

As illustrated in FIG. 4 that is a top view of the work machine 40, the first real machine imaging device 412*a* captures an image of a predetermined imaging range AR1 in front of the cab 454 at an angle of view from a right end R1 to a left end L1 along an optical axis AX1 from an interior of the cab 454. The imaging range AR1 indicates a range of an image captured by the first real machine imaging device 412*a* directed in the horizontal direction as illustrated in FIG. 3 at an angle of view from the right end R1 to the left end L1 in the horizontal direction. While the imaging range AR1 illustrated in FIG. 4 assumes a case of a horizontal ground and thus does not indicate a range in a direction along the optical axis AX1, in a case where there is a rising slope in front of the work machine 40, the imaging range AR1 can be defined by a line connecting the right end R1 and the left end L1.

Figure 5:
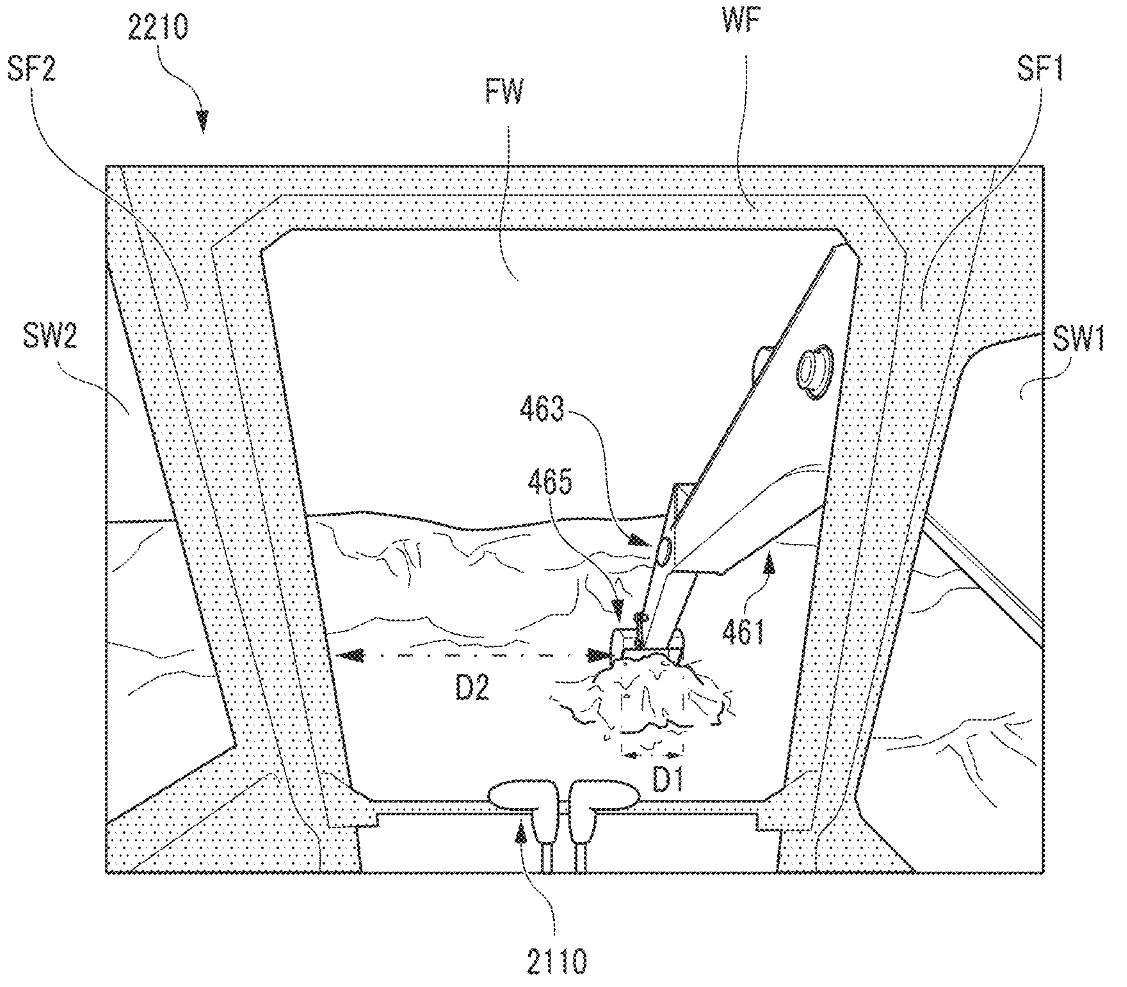
FIG. 5 is an explanatory diagram illustrating an example of a captured image captured by a first real machine imaging device in FIG. 1.

Further, as illustrated in FIG. 5, the first real machine imaging device 412*a*, for example, captures an image of the predetermined imaging range AR1 so as to include at least part of a window frame WF that is an index member positioned around a front window FW or side windows SW1 and SW2 of the cab 454, and a traveling lever 2110.

The second real machine imaging device 412*b* (sub-camera) is, for example, provided on a roof of the cab 454 or in a front portion of (front side of the cab 454) the work machine 40 in an external space and is capable of capturing an image of a sight around the work machine 40. As illustrated in FIG. 4, the second real machine imaging device

412*b* captures an image of a portion in front of the work machine 40 (front of the cab 454) at an angle of view from a right end R2 to a left end L2 in a direction along an optical axis AX2 from above the roof of the cab 454. The second real machine imaging device 412*b* includes a drive mechanism or an actuator capable of changing orientation in vertical and horizontal directions, and in FIG. 3, the second real machine imaging device 412*b* (or the optical axis AX2 thereof) is positioned so as to face forward and obliquely downward. Thus, an imaging range AR2 illustrated in FIG. 4 indicates a range of an image captured by the second real machine imaging device 412*b* at an angle of view from the right end R2 to the left end L2 in the horizontal direction. The first real machine imaging device 412*a* and the second real machine imaging device 412*b* are preferably positioned so that the imaging range AR1 of the first real machine imaging device 412*a* at least partially overlaps with the imaging range AR2 of the second real machine imaging device 412*b*.

Figure 6:
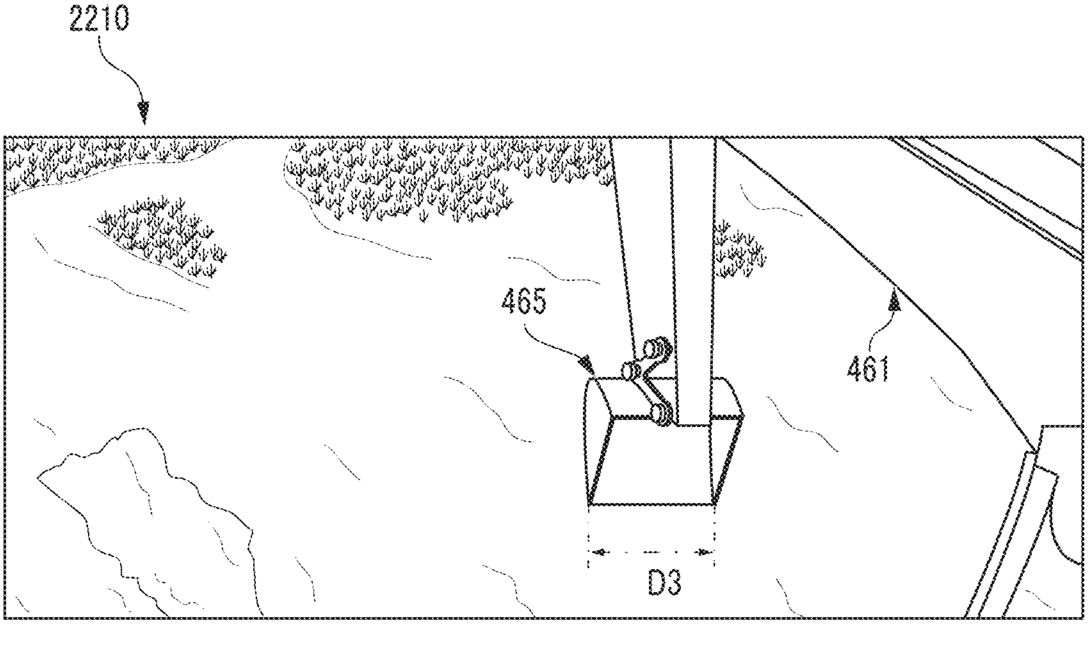
FIG. 6 is an explanatory diagram illustrating an example of a captured image captured by a second real machine imaging device in FIG. 1.

As illustrated in FIG. 6, the second real machine imaging device 412*b* can capture an image of an environment including at least part of the actuating mechanism 460. The second real machine imaging device 412*b,* for example, captures an image of an environment including at least part of the bucket 465 that is an attachment. FIG. 6 is a captured image when the second real machine imaging device 412*b* faces downward as illustrated in FIG. 3, and the ground in front of and below the work machine 40 can be seen behind the actuating mechanism 460. The imaging range AR2 of the second real machine imaging device 412*b* which overlaps with the imaging range AR1 of the first real machine imaging device 412*a,* for example, preferably includes at least part of the bucket 465. The second real machine imaging device 412*b* may be provided at a location other than the cab 454 of the work machine 40 and can be provided, for example, at a location at which the second real machine imaging device 412*b* can be fixed in the upper rotating body 450. Further, the second real machine imaging device 412*b* does not necessarily have to be provided in the work machine 40 and may be provided in a flight vehicle such as a drone or may be a fixed camera fixed at a pole, or the like, provided around a work site.

Further, the first real machine imaging device 412*a* and/or the second real machine imaging device 412*b* may be additionally provided.

The real machine input interface 410 includes real machine state sensors (not illustrated). The real machine state sensors (not illustrated) include an angle sensor for measuring each of a rotation angle (hoisting angle) of the boom 461 with respect to the upper rotating body 450, a rotation angle of the arm 463 with respect to the boom 461, and a rotation angle of the bucket 465 with respect to the arm 463, a rotation angle sensor for measuring a rotation angle of the upper rotating body 450 with respect to the lower traveling body 430, an external force sensor for measuring external force acting on the bucket 465, a three-axis acceleration sensor for measuring three-axis acceleration acting on the upper rotating body 450, a position information acquisition sensor such as a global navigation satellite system (GNSS), and the like.

The real machine output interface 420 includes real machine wireless communication equipment 422 for communication via a network.

The actuating mechanism 460 includes the boom 461 mounted on the upper rotating body 450 so as to be able to rise and fall, the arm 463 connected to a distal end of the boom 461 so as to be able to rotate, and the bucket 465 connected to a distal end of the arm 463 so as to be able to rotate. The boom cylinder 462, the arm cylinder 464 and the bucket cylinder 466 which are constituted with hydraulic cylinders that can expand and contract are mounted on the actuating mechanism 460. As a working portion, various attachments such as a nibbler, a cutter or a magnet may be used other than the bucket 465.

The boom cylinder 462 is located between the boom 461 and the upper rotating body 450 so as to rotate the boom 461 in a rising and falling direction by expanding and contracting by receiving supply of hydraulic oil. The arm cylinder 464 is located between the arm 463 and the boom 461 so as to rotate the arm 463 around a horizontal axis with respect to the boom 461 by expanding and contracting by receiving supply of hydraulic oil. The bucket cylinder 466 is located between the bucket 465 and the arm 463 so as to rotate the bucket 465 around a horizontal axis with respect to the arm 463 by expanding and contracting by receiving supply of hydraulic oil.

Function

Figure 7:
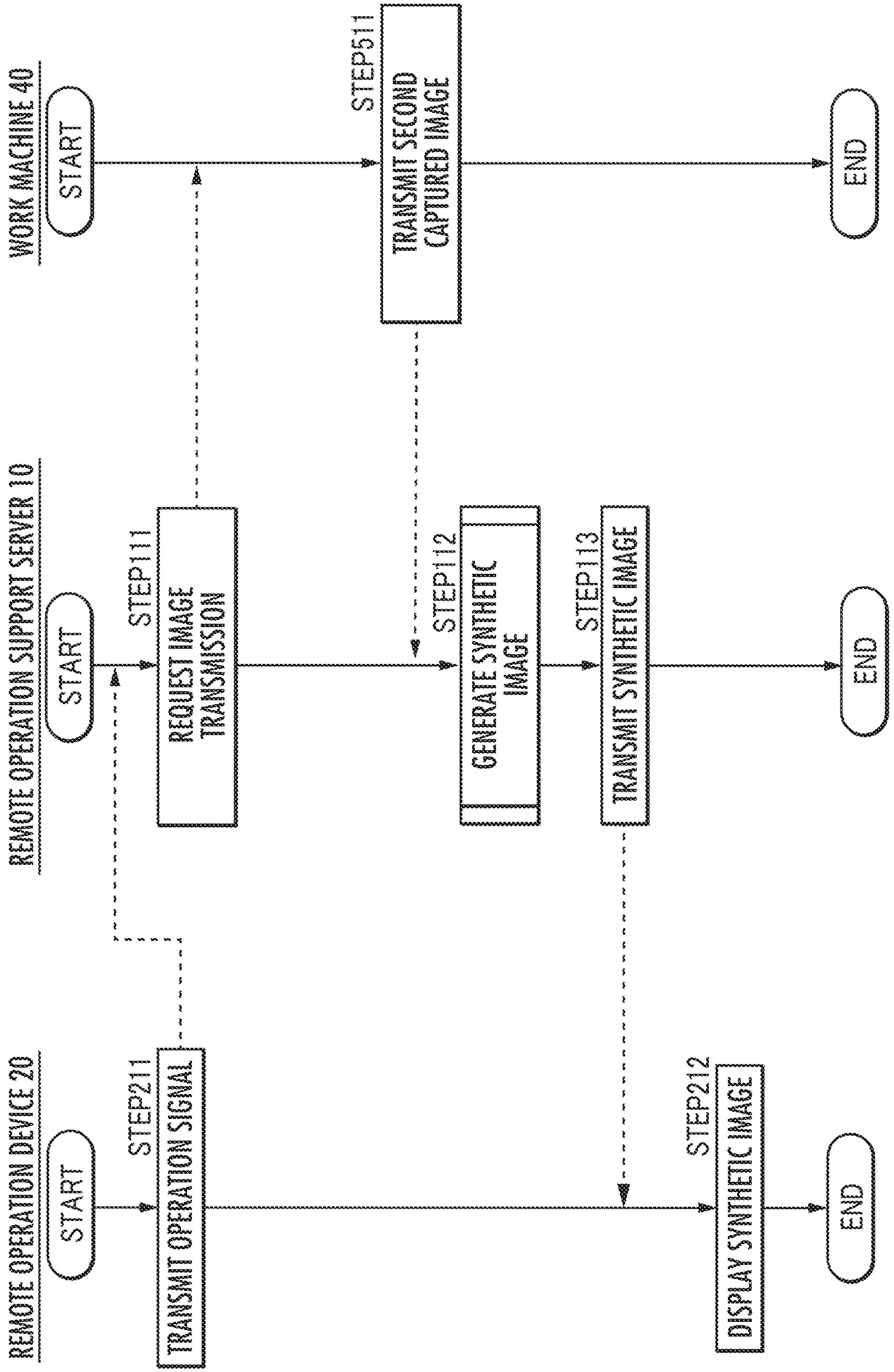
FIG. 7 is a flowchart indicating procedure of a remote operation support method of the remote operation support system.
Figure 8:
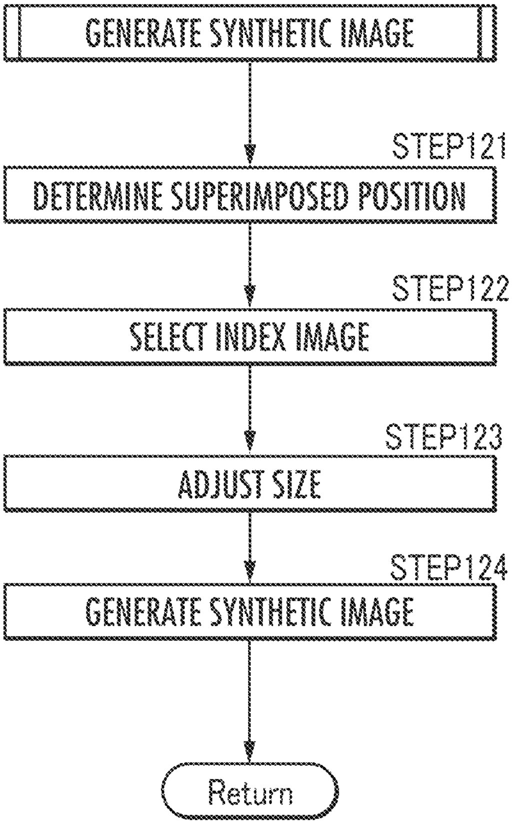
FIG. 8 is a flowchart indicating subroutines of synthetic image generation processing in FIG. 7.

A remote operation support processing method of the remote operation support system, which is to be exerted by coordination of the remote operation support server 10, the remote operation device 20, the first real machine imaging device 412*a* and the second real machine imaging device 412*b* having the above-described configuration will be described using a flowchart indicated in FIG. 7.

The remote operation support server 10 starts remote operation support processing in response to activation of the remote operation device 20. For example, if the remote operation device 20 is activated by the operator OP who is an operator, the remote operation device 20 transmits an operation signal to the remote operation support server 10 (STEP 211). Note that the operation signal is, for example, preferably transmitted as appropriate in response to processing performed after activation of the remote operation device 20, such as a timing at which the work machine 40 to be connected to (to be coordinated with) the remote operation device 20 is selected by the operator OP or a timing at which the cutoff lever is switched from an ON state to an OFF state by the operator OP.

If the remote operation support server 10 receives the operation signal, the remote operation support server 10 requests transmission of an image to the work machine 40 (STEP 111).

If the real machine control device 400 receives the image transmission request in the work machine 40, the real machine control device 400 transmits a captured image (second captured image) captured by the second real machine imaging device 412*b* to the remote operation support server 10 (STEP 511).

If the support processing element 101 of the remote operation support server 10 receives the image (second captured image) captured by the second real machine imaging device 412*b,* the support processing element 101 generates a synthetic image in which an index image corresponding to an index member positioned in the cab 454 of the work machine 40 is superimposed (STEP 112).

The support processing element 101 of the remote operation support server 10 transmits the synthetic image generated in STEP 112 to the remote operation device 20 (STEP 113).

Figure 9:
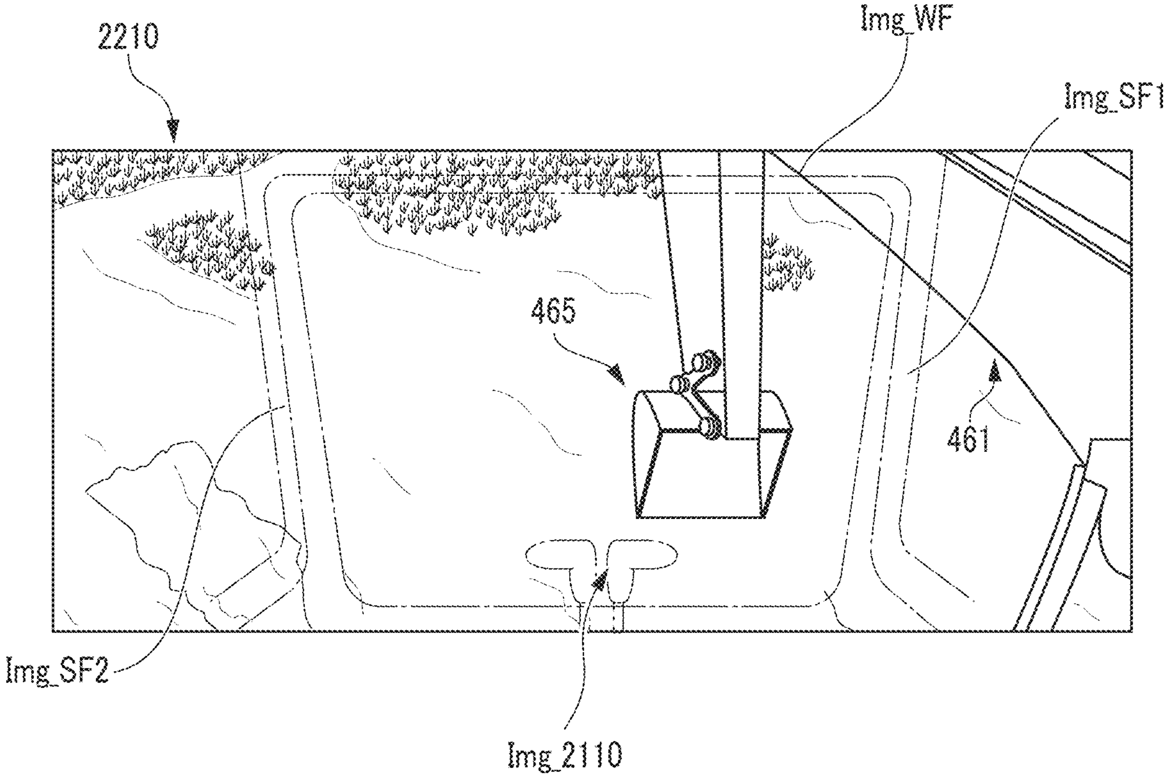
FIG. 9 is an explanatory diagram illustrating a displayed view of a synthetic image.

If the remote operation device 20 receives the synthetic image, the remote operation device 20 displays the synthetic image on the image output device 221 of the remote output interface 220 as illustrated in FIG. 9. In other words, the support processing element 101 of the remote operation support server 10 transmits the synthetic image to the remote operation device 20 and causes the synthetic image to be displayed on the remote output interface 220 of the remote operation device 20.

The synthetic image can be displayed at an arbitrary image output device of the image output device 221, and, for example, may be displayed at one of the central image output device 2210, the left image output device 2211, the right image output device 2212 and the lower image output device 2213. Further, the synthetic image may be displayed across a plurality of image output devices.

In this manner, the synthetic image in which the index image is superimposed on the second captured image is displayed on the remote output interface 220, so that, for example, the operator OP of the work machine 40 can operate the work machine 40 while viewing the index image. It is therefore possible to provide an appropriate sense of operation to the operator OP who operates the work machine 40 from a viewpoint outside the cab 454.

Subroutines of the synthetic image generation processing in STEP 112 by the support processing element 101 of the remote operation support server 10 will be described.

The support processing element 101 of the remote operation support server 10 executes synthetic image generation processing in a case where the second captured image is received.

The support processing element 101 of the remote operation support server 10 determines a manner of how an index image extends to superimpose the index image representing an index member constituting the cab 454 in a pseudo manner, on the second captured image (STEP 121).

Specifically, the support processing element 101 of the remote operation support server 10 recognizes the extending manner of the index image in the second captured image, eventually, a superimposed manner by reading out position data representing positions of a point cloud representing the extending manner of the index image in a second image coordinate system that is a two-dimensional coordinate system of the second captured image from a storage device or the database 110.

The position data is obtained by, for example, the support processing element 101 by coordinates of at least part of an image region including the index member (for example, a member included in an imaging range of the first real machine imaging device 412*a* among constituent members of the cab 454 such as A pillars (front pillars) SF1 and SF2 and/or a frame) in a first captured image captured by the first real machine imaging device 412*a* being converted into the second captured image on the basis of a position and a posture of each of the first real machine imaging device 412*a* and the second real machine imaging device 412*b* in a real machine coordinate system (a three-dimensional coordinate system in which the position and the posture are fixed with respect to the work machine 40).

Further, processing of determining a position at which the index image is to be superimposed on the second captured image may be performed by the operator OP designating the position at which the index image is to be superimposed on the second captured image. Specifically, the operator OP, for example, sets a display position by operating the remote input interface 210 to designate and input the display position to the remote operation device 20. Upon this determination of the display position, the display position of the index image superimposed on the second captured image on the basis of the position data read out from the storage device (database 110) may be corrected through operation by the operator OP via the remote input interface 210.

The support processing element 101 selects the index image designated in advance as the image to be superimposed (STEP 122). The index image can take a form corresponding to the index member. For example, in a case where the index member that is a constituent member that can be imaged by the first real machine imaging device 412*a* among the constituent members of the cab 454 is a pillar that extends in the vertical direction in front of the cab 454, the index image may have the same form as a form of the index member or may be a line extending in the vertical direction in the second captured image or may be a rectangular figure, or the like. Further, a plurality of index images may be superimposed on the second captured image. For example, the synthetic image may be generated by superimposing on the second captured image, a plurality of index images Img_SF1, Img_SF2 and Img_2110 respectively representing the A pillars SF1 and SF2 and the traveling lever 2110 as the index members in a pseudo manner. In this manner, by superimposing the image representing the traveling lever 2110 in a pseudo manner on the second captured image as the index image, recognition accuracy by the operator OP of the position and/or the posture in a real space of an object (for example, earth and sand) existing around the work machine 40, which corresponds to a portion near a lower portion of the second captured image, is improved.

Further, in a case where the index member that is a constituent member of the cab 454 is a pair of right and left pillars SF1 and SF2, the synthetic image may be generated by superimposing an index image Img_SFi representing at least one pillar SFi (i=1, 2) in a pseudo manner on the second captured image. A shape or an extending manner of the index image Img_SFi may be different from a shape or an extending manner of the index member SFi, and, for example, a shape of the index image Img_SFi representing the substantially linearly extending index member SFi in a pseudo manner may have a curved shape, a cross shape, a circular shape, a polygonal shape, or the like.

The operator OP can set a form (such as a color, a shape, a pattern or design that is an arbitrary combination of these, and whether dynamic design or static design) of the index image included in the synthetic image, for example, by executing designation operation on the remote operation device 20 through the remote input interface 210.

The support processing element 101 adjusts a size of the index image to be superimposed on the second captured image (STEP 123). Specifically, the support processing element 101 adjusts the size of the index image to be superimposed on the second captured image on the basis of information obtained through the processing of determining the superimposed position in STEP 121. Coordinates may be converted so that one pixel in the first captured image corresponds to a plurality of pixels in the second captured image or a plurality of pixels in the first captured image correspond to one pixel in the second captured image in accordance with a difference in the number of pixels and/or a magnification between the first captured image and the second captured image.

For example, in a case where, for example, a magnification of the first captured image is nearly equal to a magnification of the second captured image, the support processing element 101 adjusts the size of the index image to a size nearly equal to a size of the index member in the first captured image. Further, in a case where, for example, the magnification of the second captured image is higher than the magnification of the first captured image, the support processing element 101 adjusts the size of the index image so that the index member in the first captured image becomes larger (or thicker) in accordance with the magnification. In this manner, by superimposing the index image having a certain range, it is possible to improve visibility.

It is therefore possible to cause the index image to be displayed on the remote output interface 220 in a manner corresponding to the magnification of the second captured image. By this means, a sense of distance obtained from the synthetic image by the operator OP can be made appropriate.

In a case where the superimposed manner of the index image on the second captured image is determined (see STEP 121), the processing in STEP 121 is omitted unless operation of changing the superimposed manner is performed. Further, in a case where the index image to be superimposed on the second captured image is selected (see STEP 122), the processing in STEP 122 is omitted unless operation of changing the superimposed manner of the index image is performed. Still further, in a case where the size of the index image to be superimposed on the second captured image is adjusted (see STEP 123), the processing in STEP 123 is omitted unless operation of adjusting the size of the index image is performed.

Further, in a case where a magnification of the camera (a focal length of the lens) of the second real machine imaging device 412*b* is recognized, the support processing element 101 may display the index image with a size according to the magnification of the second captured image (the focal length of the lens). With such processing, it is possible to simplify the above-described processing and reduce processing load.

Further, the synthetic image may be generated by superimposing the index image on the second captured image in such a form that avoids decrease in visibility of the second captured image. For example, the index image may be an image having such transparency that at least part of a superimposed region in the captured image is visible or a line map representing at least one of outline or a ridge line of the index member. Other than the above, decrease in visibility of the second captured image in a region in which the index image is superimposed may be avoided by generating a dynamic synthetic image in which the index image is intermittently displayed.

Further, the index image preferably extends in the vertical direction of the second captured image. This improves recognition accuracy by the operator OP of a space corresponding to the second captured image that dynamically represents a sight around the upper rotating body 450 also while the upper rotating body 450 is rotating.

Size adjustment of the index image may be executed depending on intention of the operator OP. For example, the operator OP may set a size in the horizontal direction of the index member in the synthetic image, a size in the vertical direction of the index member in the synthetic image, and inclination of the index member in the synthetic image (positions in the horizontal direction of vertical end portions of the index image) by operating the remote input interface 210.

The support processing element 101 generates the synthetic image by superimposing the index image subjected to size adjustment in STEP 123 at the position of the second captured image determined in STEP 121 (STEP 124).

Preferably, the support processing element 101 does not normally display the synthetic image on the remote output interface 220 and displays the synthetic image on the remote output interface 220 in a case where rotation operation for the work machine 40 is started. Specifically, for example, the support processing element 101 may display the synthetic image on the remote output interface 220 in a case where input operation for the work machine 40 is started, or in a case where a predetermined period has elapsed since input operation for the work machine 40 was started. Examples of the input operation can include, for example, a case where the operator OP grips a lever for rotating the work machine 40, a case where the operator OP performs operation of tilting the lever, and the like.

Further, preferably, the support processing element 101 does not normally display the synthetic image on the remote output interface 220 and displays the synthetic image on the remote output interface 220 at a timing at which rotation operation of the work machine 40 is started or in a case where a predetermined period has elapsed since rotation operation of the work machine 40 was started. This makes it possible to display the synthetic image at a timing at which the operator OP needs the synthetic image.

Further, the support processing element 101 preferably ends display of the synthetic image on the remote output interface 220 in a case where rotation operation for the work machine 40 comes to an end. Specifically, for example, the support processing element 101 preferably ends display of the synthetic image on the remote output interface 220 at a timing at which input operation for the work machine 40 comes to an end or in a case where a predetermined period has elapsed since input operation for the work machine 40 ended. Examples of the input operation can include, for example, a case where the operator OP releases the lever for rotating the work machine 40, and the like.

Further, the support processing element 101 preferably ends display of the synthetic image on the remote output interface 220 at a timing at which rotation operation of the work machine 40 comes to an end or in a case where a predetermined period has elapsed since rotation operation of the work machine 40 ended. This makes it possible to prevent the synthetic image from being indefinitely displayed after the rotation operation comes to an end.

Upon rotation of the upper rotating body 450 with respect to the lower traveling body 430, as the index image, both a first index image immediately before start of the rotation and a second index image that is a result of the first index image being displaced in a direction opposite to the rotation direction may be superimposed on the second captured image.

Particularly, in a case where reciprocating rotation of the upper rotating body 450 with respect to the lower traveling body 430 is repeated as in work of loading earth and sand, debris, and the like, from one location to another location, spatial recognition accuracy around the work machine 40 by the operator OP is improved using the first index image and/or the second index image included in the synthetic image as a reference. Only the second index image may be superimposed on the second captured image.

The image output device 221 may output the first captured image to the remote output interface 220 in addition to or in place of the synthetic image. An index or a reference of spatial recognition is included in both the first captured image including the index image constituting the cab 454 and the synthetic image in which the index image representing the index member in a pseudo manner is superimposed on the second captured image, so that the operator OP can recognize how the upper rotating body 450 is rotated, and eventually, a space around the work machine 40 during the rotation with high accuracy.

Figure 10:
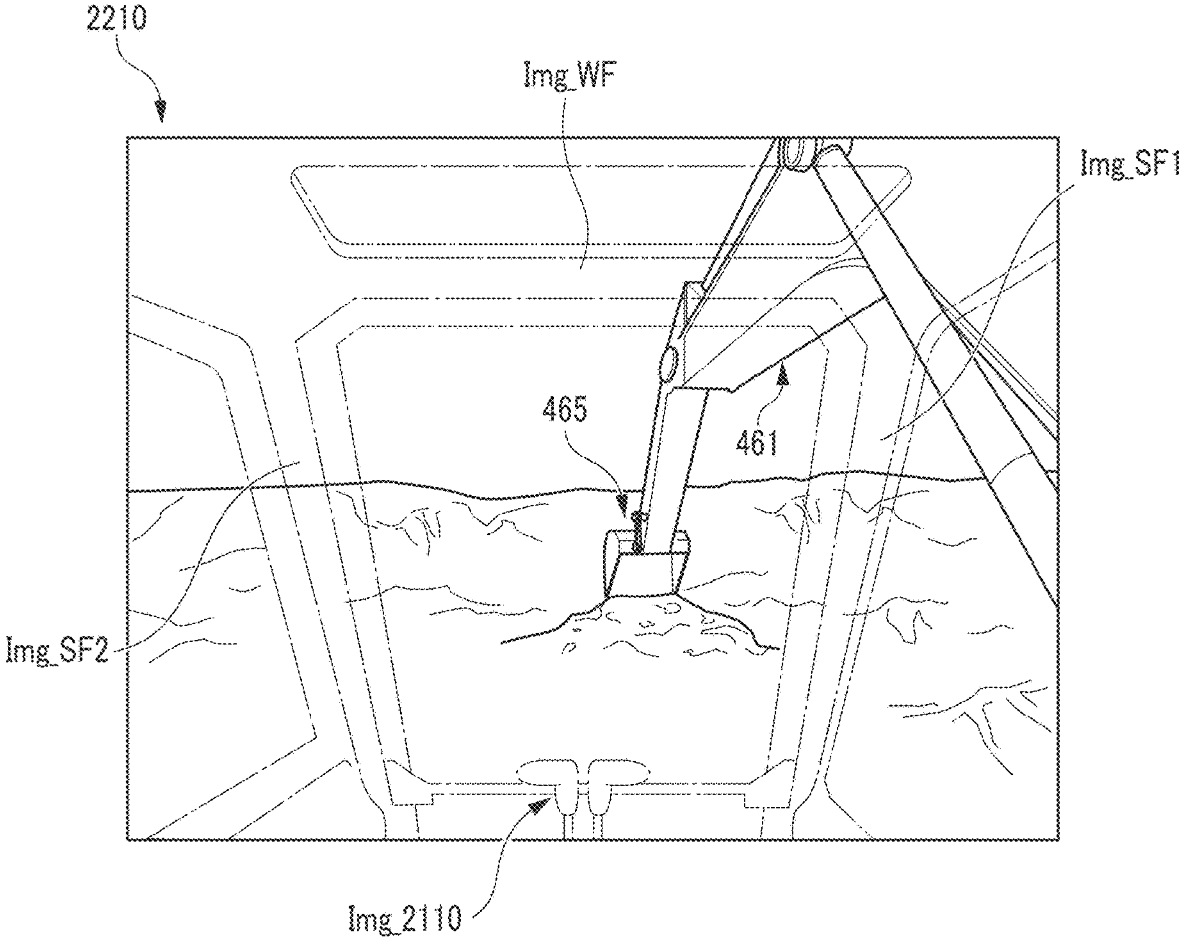
FIG. 10 is an explanatory diagram illustrating another displayed view of the synthetic image.

Further, in the above-described example, an aspect has been described where the earth surface is included in the first captured image and the second captured image. However, the first captured image and the second captured image do not have to include the earth surface, and the present invention can be applied to captured images at various imaging angles. For example, as illustrated in FIG. 10, the window frame WF of the roof of the cab 454 may be superimposed on the second captured image as the index member.

According to such an aspect, for example, in a case where movement operation in the vertical direction is frequently performed as in a case where hoisting operation of the boom 461 is frequently used, visibility of the second captured image can be improved. Further, the window frame WF is superimposed on the second captured image as the index member, so that it is possible to allow the operator OP to easily recognize that the imaging angle is not downward.

Second Example

In the above-described example, in the subroutines of the synthetic image generation processing, the processing in STEP 121 of determining the position at which the index image is to be superimposed on the second captured image has been performed by reading out position data for superimposing the index image on the second captured image stored in the storage device (database 110) in advance from the storage device (database 110). However, the position data may be generated on the basis of a size and a positional relationship of a reference object in a predetermined direction in the first captured image and a size of the reference object in the predetermined direction in the second captured image.

Specifically, the support processing element 101 acquires, for example, a size in a first predetermined direction of the reference object in the first captured image, an interval in the first predetermined direction between the reference object and the index member, and a size in a second predetermined direction corresponding to the first predetermined direction of the reference object in the second captured image. The first predetermined direction and the second predetermined direction may be defined so as to be parallel in the real space.

Specifically, as illustrated in FIG. 5, in a case where the bucket 465 of the work machine 40 is set as the reference object, and the horizontal direction of the first captured image is set as the first predetermined direction, the support processing element 101 acquires a size D1 in the horizontal direction of the bucket 465 and an interval D2 from an end point of the bucket 465 to the A pillar SFi in the horizontal direction.

The support processing element 101 acquires a size in the second predetermined direction corresponding to the first predetermined direction of the reference object in the second captured image. Specifically, as illustrated in FIG. 6, in a case where the second predetermined direction is the horizontal direction in the second captured image, the support processing element 101 recognizes a size D3 in the horizontal direction of the bucket 465.

The support processing element 101 determines the superimposed manner of the index image so that a relationship (ratio) between the size D1 in the first predetermined direction of the reference object in the first captured image and the interval D2 in the first predetermined direction between the reference object and the index member matches a relationship between the size D3 of the reference object in the second captured image and an interval in the second predetermined direction between the reference object and the index image representing the index member in a pseudo manner and stores the superimposed manner in the storage device (database 110) as the position data.

According to such an aspect, the position at which the index image is to be superimposed on the second captured image can be determined through simple processing, so that it is possible to reduce processing load.

While in the above-described embodiment, the synthetic image is generated by superimposing the index image on the second captured image, in other embodiments, the synthetic image may be generated by superimposing the index image on the first captured image. For example, in a case where the index member goes outside the first captured image as a result of the magnification of the camera of the first real machine imaging device 412*a* being increased, the synthetic image may be generated by superimposing the index image representing the index member when the index member is in the first index image in a pseudo manner on the first captured image.

While in the above-described embodiment, the remote operation support system includes the remote operation support server 10, in other embodiments, the remote operation support system may include the remote operation device 20 (the remote control device 200) and/or the work machine 40 (the real machine control device 400). The remote operation system may include (1) the remote operation support server 10, the remote operation device 20 and the work machine 40, (2) the remote operation support server 10 and the remote operation device 20, (3) the remote operation support server 10 and the work machine 40, or (4) the remote operation device 20 and the work machine 40. In this case, a plurality of devices constituting the remote operation support system execute a series of processing while coordinating with each other by utilizing an intercommunication function.

REFERENCE SIGNS LIST

10 Remote operation support server
101 Support processing element
20 Remote operation device
220 Remote output interface
40 Work machine
412*a* First real machine imaging device
412*b* Second real machine imaging device

The invention claimed is:

1. A remote operation support system that causes a synthetic image to be displayed on a remote output interface of a remote operation device that allows remote operation of work machine, the synthetic image being an image in which an index image corresponding to an index member positioned in an operator's room of the work machine is superimposed on a captured image at a displayed position where coordinates of the index image in a coordinate system of the index image are converted into a coordinate system of the captured image, the captured image captured by an imaging device, in the coordinate system in a direction along an optical axis of the imaging device, which is mounted on the work machine and which is capable of capturing an image around the work machine.

2. The remote operation support system according to claim 1, wherein the index image is an image having such transparency that at least part of a superimposed region in the captured image is visible or a line map representing at least one of outline or a ridge line of the index member.

3. The remote operation support system according to claim 1, wherein the index image is displayed with a size according to a magnification of the captured image.

4. The remote operation support system according to claim 1, wherein in a case where rotation operation of an upper rotating body on which the imaging device is mounted in the work machine with respect to a lower traveling body is started, the synthetic image is displayed on the remote output interface.

5. The remote operation support system according to claim 1, wherein in a case where rotation operation of an upper rotating body on which the imaging device is mounted in the work machine with respect to a lower traveling body comes to an end, display of the synthetic image on the remote output interface is ended.

6. A remote operation support composite system comprising:

the remote operation support system according to claim 1; and at least one of a work machine or a remote operation device.

7. A remote operation support method comprising:

a step of causing a synthetic image to be displayed on a remote output interface of a remote operation device that allows remote operation of work machine, the synthetic image being an image in which an index image corresponding to an index member positioned in an operator's room of the work machine is superimposed on a captured image at a displayed position where coordinates of the index image in a coordinate system of the index image are converted into a coordinate system of the captured image, the captured image captured by an imaging device, in the coordinate system in a direction along an optical axis of the imaging device, which is mounted on the work machine and which is capable of capturing an image around the work machine.

* * * * *